United States Patent
Meiri

(10) Patent No.: US 10,324,635 B1
(45) Date of Patent: Jun. 18, 2019

(54) ADAPTIVE COMPRESSION FOR DATA REPLICATION IN A STORAGE SYSTEM

(71) Applicant: EMC Corporation, Hopkinton, MA (US)

(72) Inventor: David Meiri, Cambridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 73 days.

(21) Appl. No.: 15/076,946

(22) Filed: Mar. 22, 2016

(51) Int. Cl.
G06F 3/06 (2006.01)

(52) U.S. Cl.
CPC ............ G06F 3/0619 (2013.01); G06F 3/065 (2013.01); G06F 3/0608 (2013.01); G06F 3/0661 (2013.01); G06F 3/0683 (2013.01)

(58) Field of Classification Search
None
See application file for complete search history.

(56) References Cited

U.S. PATENT DOCUMENTS

| | | | |
|---|---|---|---|
| 4,164,763 A | 8/1979 | Briccetti et al. | |
| 4,608,839 A | 9/1986 | Tibbals, Jr. | |
| 4,821,178 A | 4/1989 | Levin et al. | |
| 5,276,898 A * | 1/1994 | Kiel | G06F 11/3409 358/1.9 |
| 5,319,645 A | 6/1994 | Bassi et al. | |
| 5,537,534 A | 7/1996 | Voigt et al. | |
| 5,539,907 A | 7/1996 | Srivastava et al. | |
| 5,627,995 A | 5/1997 | Miller et al. | |
| 5,710,724 A | 1/1998 | Burrows | |
| 5,732,273 A | 3/1998 | Srivastava et al. | |
| 5,860,137 A | 1/1999 | Raz et al. | |

(Continued)

FOREIGN PATENT DOCUMENTS

| EP | 1804157 | 7/2007 |
|---|---|---|
| WO | WO 2010/019596 | 2/2010 |

(Continued)

OTHER PUBLICATIONS

Response to U.S. Final Office Action dated Apr. 6, 2016 corresponding to U.S. Appl. No. 14/034,981; Response filed on Jun. 16, 2016; 11 pages.

(Continued)

*Primary Examiner* — Sean D Rossiter
*Assistant Examiner* — Stephanie Wu
(74) *Attorney, Agent, or Firm* — Daly, Crowley Mofford & Durkee, LLP

(57) ABSTRACT

Described embodiments provide systems and processes for performing data replication in a storage system. The data replication operation replicates data from at least one source device to at least one target device of the storage system. A link capacity of a link between at least one source device and at least one target device is determined. Processor overhead associated with one or more data compression processes, and one or more operating conditions of the storage system are determined. Based at least at least in part upon the determined link capacity, the determined processor overhead, and the determined one or more operating conditions, one or more settings of a data replication operation of the storage system are adapted. The data replication operation is performed according to the adapted one or more settings.

13 Claims, 5 Drawing Sheets

(56) References Cited

U.S. PATENT DOCUMENTS

| | | | |
|---|---|---|---|
| 5,896,538 A | 4/1999 | Blandy et al. | |
| 5,903,730 A | 5/1999 | Asai et al. | |
| 5,940,618 A | 8/1999 | Blandy et al. | |
| 5,940,841 A | 8/1999 | Schmuck et al. | |
| 5,987,250 A | 11/1999 | Subrahmanyam | |
| 5,999,842 A | 12/1999 | Harrison et al. | |
| 6,182,086 B1 | 1/2001 | Lomet et al. | |
| 6,226,787 B1 | 5/2001 | Serra et al. | |
| 6,327,699 B1 | 12/2001 | Larus et al. | |
| 6,353,805 B1 | 3/2002 | Zahir et al. | |
| 6,470,478 B1 | 10/2002 | Bargh et al. | |
| 6,496,908 B1 | 12/2002 | Kamvysselis et al. | |
| 6,519,766 B1 | 2/2003 | Barritz et al. | |
| 6,553,464 B1 | 4/2003 | Kamvysselis et al. | |
| 6,640,280 B1 | 10/2003 | Kamvysselis et al. | |
| 6,643,654 B1 | 11/2003 | Patel et al. | |
| 6,654,948 B1 | 11/2003 | Konum et al. | |
| 6,658,471 B1 | 12/2003 | Berry et al. | |
| 6,658,654 B1 | 12/2003 | Berry et al. | |
| 6,801,914 B2 | 10/2004 | Barga et al. | |
| 6,820,218 B1 | 11/2004 | Barga et al. | |
| 6,862,632 B1 | 3/2005 | Halstead et al. | |
| 6,870,929 B1 | 3/2005 | Greene | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |
| 6,944,726 B2 | 9/2005 | Yoder et al. | |
| 6,968,369 B2 | 11/2005 | Veprinsky et al. | |
| 6,976,139 B2 | 12/2005 | Halstead et al. | |
| 7,000,086 B2 | 2/2006 | Meiri et al. | |
| 7,024,525 B2 | 4/2006 | Yoder et al. | |
| 7,032,228 B1 | 4/2006 | McGillis et al. | |
| 7,051,176 B2 | 5/2006 | Meiri et al. | |
| 7,054,883 B2 | 5/2006 | Meiri et al. | |
| 7,099,797 B1 | 8/2006 | Richard | |
| 7,113,945 B1 | 9/2006 | Moreshet et al. | |
| 7,114,033 B2 | 9/2006 | Longinov et al. | |
| 7,143,410 B1 | 11/2006 | Coffman et al. | |
| 7,174,423 B2 | 2/2007 | Meiri et al. | |
| 7,197,616 B2 | 3/2007 | Meiri et al. | |
| 7,228,456 B2 | 6/2007 | Lecrone et al. | |
| 7,240,116 B2 | 7/2007 | Marshak et al. | |
| 7,251,663 B1 | 7/2007 | Smith | |
| 7,292,969 B1 | 11/2007 | Aharoni et al. | |
| 7,315,795 B2 | 1/2008 | Homma | |
| 7,376,651 B2 | 5/2008 | Moreshet et al. | |
| 7,380,082 B2 | 5/2008 | Meiri et al. | |
| 7,383,385 B2 | 6/2008 | Meiri et al. | |
| 7,383,408 B2 | 6/2008 | Meiri et al. | |
| 7,386,668 B2 | 6/2008 | Longinov et al. | |
| 7,389,497 B1 | 6/2008 | Edmark et al. | |
| 7,392,360 B1 | 6/2008 | Aharoni et al. | |
| 7,409,470 B2 | 8/2008 | Halstead et al. | |
| 7,421,681 B2 | 9/2008 | DeWitt, Jr. et al. | |
| 7,430,589 B2 | 9/2008 | Veprinsky et al. | |
| 7,552,125 B1 | 6/2009 | Evans | |
| 7,574,587 B2 | 8/2009 | DeWitt, Jr. et al. | |
| 7,577,957 B1 | 8/2009 | Kamvysselis et al. | |
| 7,613,890 B1 | 11/2009 | Meiri | |
| 7,617,372 B1 | 11/2009 | Bjornsson et al. | |
| 7,672,005 B1 | 3/2010 | Hobbs et al. | |
| 7,693,999 B2 | 4/2010 | Park | |
| 7,702,871 B1 | 4/2010 | Arnon et al. | |
| 7,714,747 B2 | 5/2010 | Fallon | |
| 7,814,218 B1 | 10/2010 | Knee et al. | |
| 7,827,136 B1 | 11/2010 | Wang et al. | |
| 7,870,195 B1 | 1/2011 | Meiri | |
| 7,908,436 B1 | 3/2011 | Srinivasan et al. | |
| 8,046,545 B2 | 10/2011 | Meiri et al. | |
| 8,078,813 B2 | 12/2011 | LeCrone et al. | |
| 8,200,923 B1 | 6/2012 | Healey et al. | |
| 8,332,687 B1 | 12/2012 | Natanzon et al. | |
| 8,335,771 B1 | 12/2012 | Natanzon et al. | |
| 8,335,899 B1 | 12/2012 | Meiri et al. | |
| 8,468,180 B1 | 6/2013 | Meiri et al. | |
| 8,478,951 B1 | 7/2013 | Healey et al. | |
| 8,578,204 B1 | 11/2013 | Ortenberg et al. | |
| 8,600,943 B1 | 12/2013 | Fitzgerald et al. | |
| 8,677,087 B2 | 3/2014 | Meiri et al. | |
| 8,694,700 B1 | 4/2014 | Natanzon et al. | |
| 8,706,959 B1 | 4/2014 | Arnon et al. | |
| 8,719,497 B1 | 5/2014 | Don et al. | |
| 8,732,124 B1 | 5/2014 | Arnon et al. | |
| 8,782,357 B2 | 7/2014 | Halstead et al. | |
| 8,812,595 B2 | 8/2014 | Meiri et al. | |
| 8,825,964 B1 | 9/2014 | Sopka et al. | |
| 8,838,849 B1 | 9/2014 | Meiri et al. | |
| 8,862,546 B1 | 10/2014 | Natanzon et al. | |
| 8,914,596 B2 | 12/2014 | Lecrone et al. | |
| 8,966,211 B1 | 2/2015 | Arnon et al. | |
| 8,977,826 B1 | 3/2015 | Meiri et al. | |
| 8,984,241 B2 * | 3/2015 | Aizman | G06F 11/1076 711/114 |
| 9,002,904 B1 | 4/2015 | Meiri et al. | |
| 9,009,437 B1 | 4/2015 | Bjornsson et al. | |
| 9,026,492 B1 | 5/2015 | Shorey et al. | |
| 9,026,696 B1 | 5/2015 | Natanzon et al. | |
| 9,037,816 B1 | 5/2015 | Halstead et al. | |
| 9,037,822 B1 | 5/2015 | Meiri et al. | |
| 9,100,343 B1 | 8/2015 | Riordan et al. | |
| 9,104,326 B2 | 8/2015 | Frank et al. | |
| 9,110,693 B1 | 8/2015 | Meiri et al. | |
| 9,128,942 B1 | 9/2015 | Pfau et al. | |
| 9,208,162 B1 | 12/2015 | Hallak et al. | |
| 9,270,592 B1 | 2/2016 | Sites | |
| 9,286,003 B1 | 3/2016 | Hallak et al. | |
| 9,304,889 B1 | 4/2016 | Chen et al. | |
| 9,323,750 B2 | 4/2016 | Natanzon et al. | |
| 9,330,048 B1 | 5/2016 | Bhatnagar et al. | |
| 9,342,465 B1 | 5/2016 | Meiri | |
| 9,378,106 B1 | 6/2016 | Ben-Moshe et al. | |
| 9,396,243 B1 | 7/2016 | Halevi et al. | |
| 9,418,131 B1 | 8/2016 | Halevi et al. | |
| 9,483,355 B1 | 11/2016 | Meiri et al. | |
| 9,524,220 B1 | 12/2016 | Veprinsky et al. | |
| 9,558,083 B2 | 1/2017 | LeCrone et al. | |
| 9,606,739 B1 | 3/2017 | LeCrone et al. | |
| 9,606,870 B1 | 3/2017 | Meiri et al. | |
| 9,753,663 B1 | 9/2017 | LeCrone et al. | |
| 9,762,460 B2 | 9/2017 | Pawlowski et al. | |
| 9,769,254 B2 * | 9/2017 | Gilbert | H04L 41/5025 |
| 9,785,468 B1 | 10/2017 | Mitchell et al. | |
| 9,959,063 B1 | 5/2018 | Meiri et al. | |
| 9,959,073 B1 | 5/2018 | Meiri | |
| 10,007,466 B1 | 6/2018 | Meiri et al. | |
| 10,025,843 B1 | 7/2018 | Meiri et al. | |
| 10,055,161 B1 | 8/2018 | Meiri et al. | |
| 10,095,428 B1 | 10/2018 | Meiri et al. | |
| 10,152,527 B1 | 12/2018 | Meiri et al. | |
| 2002/0056031 A1 | 5/2002 | Skiba et al. | |
| 2002/0133512 A1 | 9/2002 | Milillo et al. | |
| 2003/0023656 A1 | 1/2003 | Hutchison et al. | |
| 2003/0079041 A1 * | 4/2003 | Parrella, Sr. | G06F 17/30902 709/247 |
| 2003/0126122 A1 | 7/2003 | Bosley et al. | |
| 2003/0145251 A1 | 7/2003 | Cantrill | |
| 2004/0030721 A1 * | 2/2004 | Kruger | G06F 11/1461 |
| 2004/0267835 A1 | 12/2004 | Zwilling et al. | |
| 2005/0039171 A1 | 2/2005 | Avakian et al. | |
| 2005/0102547 A1 * | 5/2005 | Keeton | G06F 11/008 714/1 |
| 2005/0125626 A1 | 6/2005 | Todd | |
| 2005/0144416 A1 | 6/2005 | Lin | |
| 2005/0171937 A1 | 8/2005 | Hughes et al. | |
| 2005/0177603 A1 * | 8/2005 | Shavit | G06F 11/2074 |
| 2005/0193084 A1 | 9/2005 | Todd et al. | |
| 2005/0278346 A1 | 12/2005 | Shang et al. | |
| 2006/0031653 A1 | 2/2006 | Todd et al. | |
| 2006/0031787 A1 | 2/2006 | Ananth et al. | |
| 2006/0047776 A1 * | 3/2006 | Chieng | G06F 11/203 709/217 |
| 2006/0070076 A1 | 3/2006 | Ma | |

(56) References Cited

U.S. PATENT DOCUMENTS

| | | | |
|---|---|---|---|
| 2006/0123212 A1* | 6/2006 | Yagawa | G06F 11/2058 711/162 |
| 2006/0242442 A1 | 10/2006 | Armstrong et al. | |
| 2007/0078982 A1* | 4/2007 | Aidun | G06F 11/2025 709/225 |
| 2007/0208788 A1 | 9/2007 | Chakravarty et al. | |
| 2007/0297434 A1 | 12/2007 | Arndt et al. | |
| 2008/0098183 A1 | 4/2008 | Morishita et al. | |
| 2008/0163215 A1 | 7/2008 | Jiang et al. | |
| 2008/0178050 A1 | 7/2008 | Kern et al. | |
| 2008/0228772 A1* | 9/2008 | Plamondon | G06F 17/30902 |
| 2008/0228864 A1* | 9/2008 | Plamondon | G06F 17/30902 709/203 |
| 2008/0228899 A1* | 9/2008 | Plamondon | H04L 67/28 709/219 |
| 2008/0228938 A1* | 9/2008 | Plamondon | H04L 12/4641 709/233 |
| 2008/0229017 A1* | 9/2008 | Plamondon | H04L 67/2847 711/118 |
| 2008/0229020 A1* | 9/2008 | Plamondon | G06F 12/0813 711/122 |
| 2008/0229021 A1* | 9/2008 | Plamondon | H04L 67/2847 711/125 |
| 2008/0229023 A1* | 9/2008 | Plamondon | G06F 12/0862 711/126 |
| 2008/0229024 A1* | 9/2008 | Plamondon | H04L 67/28 711/126 |
| 2008/0229025 A1* | 9/2008 | Plamondon | G06F 12/0862 711/126 |
| 2008/0243952 A1 | 10/2008 | Webman et al. | |
| 2008/0288739 A1 | 11/2008 | Bamba et al. | |
| 2009/0006745 A1 | 1/2009 | Cavallo et al. | |
| 2009/0030986 A1* | 1/2009 | Bates | G06F 3/0607 709/205 |
| 2009/0049450 A1 | 2/2009 | Dunshea et al. | |
| 2009/0055613 A1 | 2/2009 | Maki et al. | |
| 2009/0089483 A1 | 4/2009 | Tanaka et al. | |
| 2009/0100108 A1 | 4/2009 | Chen et al. | |
| 2009/0222596 A1 | 9/2009 | Flynn et al. | |
| 2009/0319996 A1 | 12/2009 | Shafi et al. | |
| 2010/0042790 A1 | 2/2010 | Mondal et al. | |
| 2010/0088296 A1 | 4/2010 | Periyagaram et al. | |
| 2010/0180145 A1 | 7/2010 | Chu | |
| 2010/0199066 A1 | 8/2010 | Artan et al. | |
| 2010/0205330 A1 | 8/2010 | Noborikawa et al. | |
| 2010/0223619 A1 | 9/2010 | Jaquet et al. | |
| 2010/0257149 A1 | 10/2010 | Cognigni et al. | |
| 2011/0060722 A1* | 3/2011 | Li | G06F 11/2038 707/649 |
| 2011/0078494 A1 | 3/2011 | Maki et al. | |
| 2011/0083026 A1 | 4/2011 | Mikami et al. | |
| 2011/0099342 A1 | 4/2011 | Ozdemir | |
| 2011/0119679 A1 | 5/2011 | Muppirala et al. | |
| 2011/0161297 A1* | 6/2011 | Parab | G06F 17/30156 707/646 |
| 2011/0202744 A1 | 8/2011 | Kulkarni et al. | |
| 2011/0225122 A1 | 9/2011 | Denuit et al. | |
| 2011/0289291 A1 | 11/2011 | Agombar et al. | |
| 2012/0054472 A1 | 3/2012 | Altman et al. | |
| 2012/0059799 A1 | 3/2012 | Oliveira et al. | |
| 2012/0078852 A1* | 3/2012 | Haselton | G06F 11/1451 707/654 |
| 2012/0124282 A1 | 5/2012 | Frank et al. | |
| 2012/0158736 A1 | 6/2012 | Milby | |
| 2012/0278793 A1 | 11/2012 | Jalan et al. | |
| 2012/0290546 A1 | 11/2012 | Smith et al. | |
| 2012/0290798 A1 | 11/2012 | Huang et al. | |
| 2012/0304024 A1 | 11/2012 | Rohleder et al. | |
| 2013/0031077 A1 | 1/2013 | Liu et al. | |
| 2013/0054524 A1 | 2/2013 | Anglin et al. | |
| 2013/0073527 A1 | 3/2013 | Bromley | |
| 2013/0110783 A1 | 5/2013 | Wertheimer et al. | |
| 2013/0111007 A1 | 5/2013 | Hoffmann et al. | |
| 2013/0138607 A1 | 5/2013 | Bashyam et al. | |
| 2013/0151683 A1 | 6/2013 | Jain et al. | |
| 2013/0151759 A1 | 6/2013 | Shim et al. | |
| 2013/0166549 A1* | 6/2013 | Goldman | G06F 9/5016 707/736 |
| 2013/0198854 A1 | 8/2013 | Erway et al. | |
| 2013/0246354 A1 | 9/2013 | Clayton et al. | |
| 2013/0246724 A1 | 9/2013 | Furuya | |
| 2013/0265883 A1 | 10/2013 | Henry et al. | |
| 2013/0282997 A1* | 10/2013 | Suzuki | G06F 3/0608 711/162 |
| 2013/0318051 A1 | 11/2013 | Kumar et al. | |
| 2013/0318221 A1* | 11/2013 | Anaya | G06F 9/505 709/223 |
| 2013/0332610 A1* | 12/2013 | Beveridge | G06F 9/45558 709/226 |
| 2013/0339533 A1 | 12/2013 | Neerincx et al. | |
| 2014/0032964 A1 | 1/2014 | Neerincx et al. | |
| 2014/0040199 A1 | 2/2014 | Golab et al. | |
| 2014/0040343 A1 | 2/2014 | Nickolov et al. | |
| 2014/0108727 A1* | 4/2014 | Sakashita | G06F 12/0862 711/118 |
| 2014/0136759 A1 | 5/2014 | Sprouse et al. | |
| 2014/0143206 A1 | 5/2014 | Pittelko | |
| 2014/0195484 A1 | 7/2014 | Wang et al. | |
| 2014/0237201 A1* | 8/2014 | Swift | H04L 67/1095 711/162 |
| 2014/0279884 A1* | 9/2014 | Dantkale | G06F 17/30575 707/620 |
| 2014/0297588 A1* | 10/2014 | Babashetty | G06F 11/1458 707/613 |
| 2014/0359231 A1* | 12/2014 | Matthews | H04L 49/90 711/147 |
| 2014/0380005 A1* | 12/2014 | Furuya | G06F 3/065 711/162 |
| 2014/0380282 A1 | 12/2014 | Ravindranath Sivalingam et al. | |
| 2015/0006910 A1 | 1/2015 | Shapiro | |
| 2015/0088823 A1 | 3/2015 | Chen et al. | |
| 2015/0112933 A1* | 4/2015 | Satapathy | G06F 17/30575 707/634 |
| 2015/0134723 A1* | 5/2015 | Kansal | H04L 67/1031 709/203 |
| 2015/0149739 A1* | 5/2015 | Seo | G06F 3/0608 711/162 |
| 2015/0161194 A1 | 6/2015 | Provenzano et al. | |
| 2015/0205816 A1 | 7/2015 | Periyagaram et al. | |
| 2015/0249615 A1* | 9/2015 | Chen | G06F 9/45558 709/226 |
| 2015/0324236 A1 | 11/2015 | Gopalan et al. | |
| 2015/0370488 A1* | 12/2015 | Watanabe | G06F 12/04 711/103 |
| 2016/0034692 A1 | 2/2016 | Singler | |
| 2016/0042285 A1* | 2/2016 | Gilenson | G06N 5/046 706/47 |
| 2016/0062853 A1 | 3/2016 | Sugabrahmam et al. | |
| 2016/0080482 A1* | 3/2016 | Gilbert | H04L 41/5025 709/226 |
| 2016/0188419 A1 | 6/2016 | Dagar | G06F 11/1451 707/654 |
| 2016/0350391 A1* | 12/2016 | Vijayan | G06F 17/30575 |
| 2016/0359968 A1* | 12/2016 | Chitti | H04L 67/1095 |
| 2016/0366206 A1* | 12/2016 | Shemer | H04L 65/80 |
| 2017/0123704 A1* | 5/2017 | Sharma | G06F 3/0626 |
| 2017/0139786 A1* | 5/2017 | Simon | G06F 11/1469 |
| 2017/0161348 A1* | 6/2017 | Araki | G06F 17/30575 |
| 2017/0201602 A1* | 7/2017 | Harnik | H04L 69/04 |

FOREIGN PATENT DOCUMENTS

| | | |
|---|---|---|
| WO | WO 2010/040078 | 4/2010 |
| WO | WO 2012/066525 | 5/2012 |

OTHER PUBLICATIONS

Notice of Allowance dated Jun. 29, 2016 corresponding to U.S. Appl. No. 14/034,981; 14 pages.

(56) References Cited

OTHER PUBLICATIONS

Notice of Allowance dated May 20, 2016 corresponding to U.S. Appl. No. 14/037,577; 19 pages.
Notice of Allowance dated Jun. 6, 2016 corresponding to U.S. Appl. No. 14/317,449; 43 pages.
Response filed on May 2, 2015 to the Non-Final Office Action dated Dec. 1, 2015; for U.S. Appl. No. 14/230,405; 8 pages.
Response filed on May 2, 2016 to the Non-Final Office Action dated Feb. 4, 2016; for U.S. Appl. No. 14/037,577; 10 pages.
U.S. Appl. No. 15/196,674, filed Jun. 29, 2016, Kleiner, et al.
U.S. Appl. No. 15/196,427, filed Jun. 29, 2016, Shveidel.
U.S. Appl. No. 15/196,374, filed Jun. 29, 2016, Shveidel, et al.
U.S. Appl. No. 15/196,447, filed Jun. 29, 2016, Shveidel, et al.
U.S. Appl. No. 15/196,472, filed Jun. 29, 2016, Shveidel.
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri at al.
U.S. Appl. No. 15/085,168, filed Mar. 30, 2016, Meiri et al.
U.S. Appl. No. 15/076,775, filed Mar. 22, 2016, Chan et al.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri at al.
PCT International Search Report and Written Opinion dated Dec. 1, 2011 for PCT Application No. PCT/IL2011/000692; 11 Pages.
PCT internationai Preliminary Report dated May 30. 2013 for PCT Patent Application No. PCT/IL2011/000692; 7 Pages.
U.S. Appl. No. 12/945,915.
Nguyen at al., "B+ Hash Tree: Optimizing Query Execution Times for on-Disk Semantic Web Data Structures;" Proceedings of the $6^{th}$ International Workshop on Scalable Semantic Web Knowledge Base Systems; Shanghai, China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,981; 28 Pages.
Response to Office Action dated Jul. 22, 2015 corresponding to U.S. Appl. No. 14/034,981; Response filed on Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed on Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405;Response filed Oct. 6, 2015; 1 Page.
Office Action dated Dec. 1, 2015 corresponding to U.S. Appl. No. 14/230,405; 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899: 19 Pages.
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981: 38 Pages.
Response to U.S. Non-Final Office Action dated Jul. 6, 2017 for U.S. Appl. No. 14/494,895; Response filed Oct. 3, 2017; 10 Pages.
U.S. Non-Final Office Action dated Jul. 6, 2017 for U.S. Appl. No. 14/494,895; 36 Pages.
Office Action dated Nov. 1, 2017 corresponding to U.S. Appl. No. 15/196,374, 64 Pages.
U.S. Non-Final Office Action dated Jan. 11, 2018 corresponding to U.S. Appl. No. 15/085,168; 14 Pages.
U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.
U.S. Notice of Allowance dated May 9, 2018 for U.S. Appl. No. 15/196,447; 12 Pages.
Feng et al., "eMuse: QoS Guarantees for Shared Storage Servers;" $22^{nd}$ International Conference on Advanced Information Networking and Applications—Workshops; Mar. 25, 2008; 6 Pages.
Schaelicke et al. "Improving I/O Performance with a Conditional Store Buffer;" $31^{st}$ Annual ACM/IEEE International Symposium on Microarchitecture; Dec. 2, 1998; 10 Pages.
Ye et al., "Buffering and Flow Control in Optical Switches for High Performance Computing;" IEEE/OSA Journal of Optical Communications and Networking, vol. 3, No. 8; Aug. 2011; 14 Pages.
Zhang et al., "Storage Performance Virtualization via Throughput and Latency Control;" Proceedings of the $13^{th}$ IEEE International Symposium on Modeling, Analysis, and Simulation of Computer and Telecommunication Systems (MASCOTS '05); Sep. 27, 2005; 8 Pages.
U.S. Non-Final Office Action dated Dec. 1, 2017 for U.S. Appl. No. 14/979,890; 10 Pages.
U.S. Non-Final Office Action dated Dec. 11, 2017 for U.S. Appl. No. 15/196,447; 54 Pages.
U.S. Final Office Action dated Nov. 2, 2017 for U.S Appl. No. 14/494,895; 12 Pages.
U.S. Notice of Allowance dated Jan. 26, 2018 corresponding to U.S. Appl. No. 15/085,172; 8 Pages.
U.S. Notice of Allowance dated Jan. 24, 2018 corresponding to U.S. Appl. No. 15/085,181; 8 Pages.
Response to U.S. Non-Final Office Action dated Nov. 1, 2017 corresponding to U.S. Appl. No. 15/196,374; Response Filed Jan. 30, 2018; 14 Pages.
U.S. Notice of Allowance dated Feb. 21, 2018 corresponding to U.S. Appl. No. 15/196,427; 31 Pages.
Response to U.S. Non-Final Office Action dated Dec. 11, 2017 for U.S. Appl. No. 15/196,447; Response filed on Mar. 12, 2018; 12 pages.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.

* cited by examiner

100

200

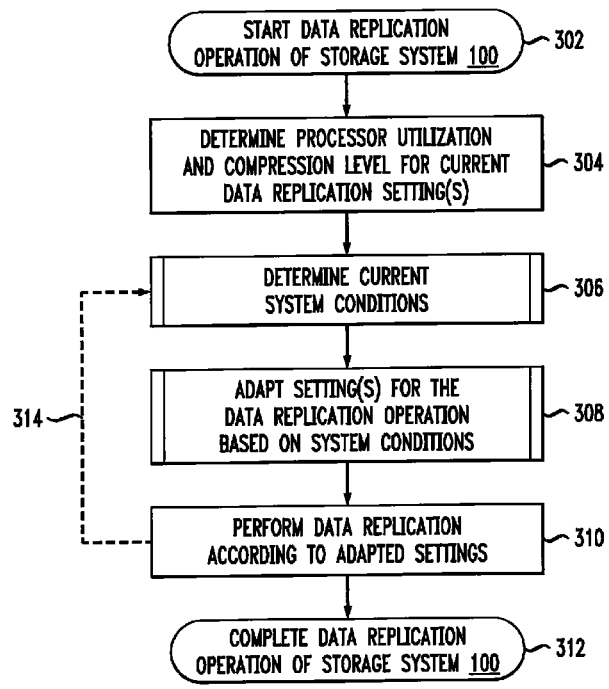

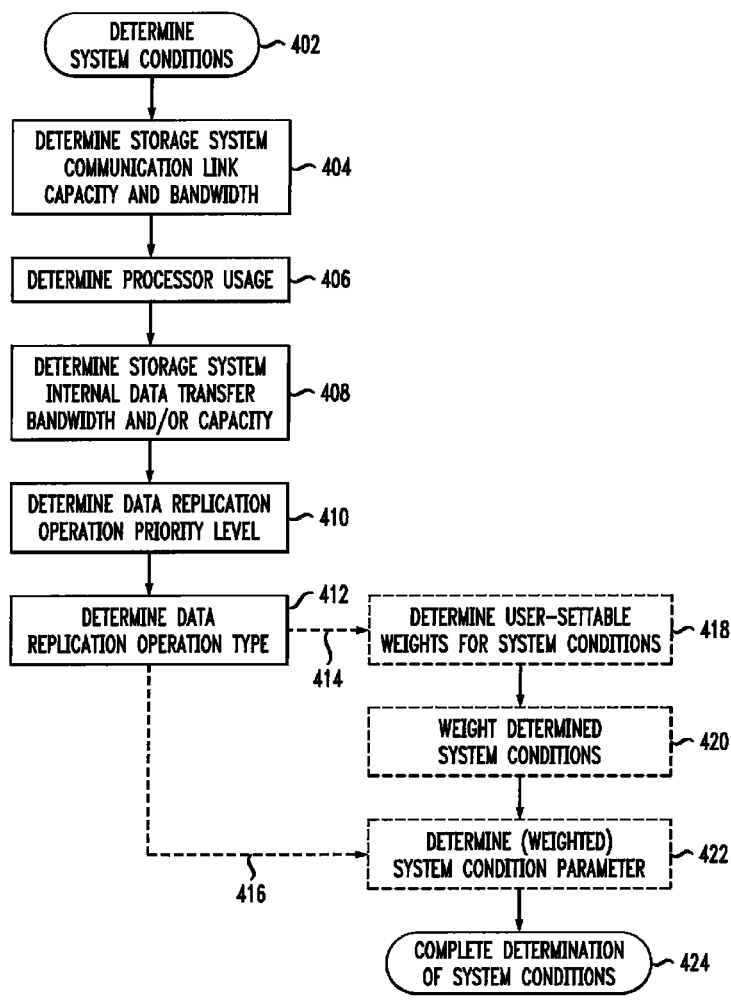

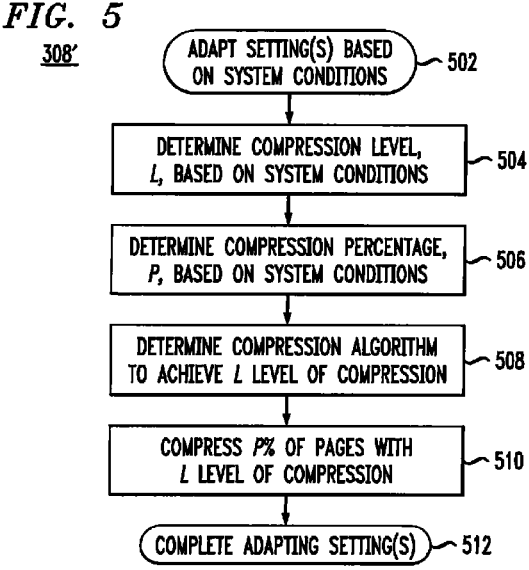
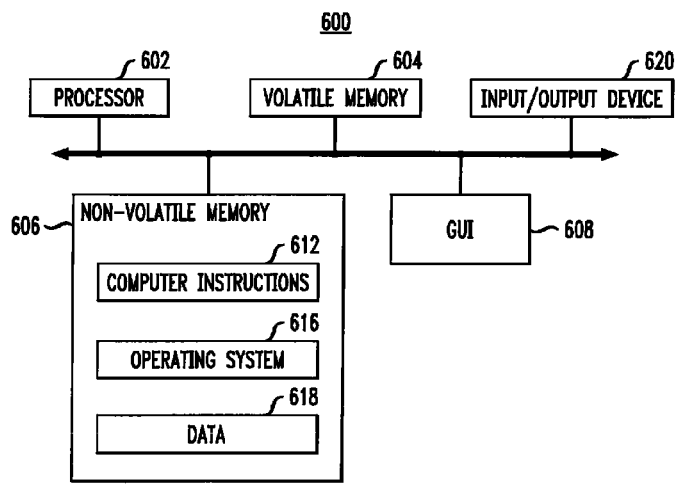

ADAPTIVE COMPRESSION FOR DATA REPLICATION IN A STORAGE SYSTEM

BACKGROUND

Computer data is increasingly vital to modern organizations, and protecting against data loss in the event of a system failure is an increasingly important organization objective. Data protection systems for storing organizational source (e.g., production) site data on a periodic basis suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself is both time consuming and can consume system resources.

Some data protection systems use data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a process for performing data replication in a storage system. The data replication operation replicates data from at least one source device to at least one target device of the storage system. A link capacity of a link between at least one source device and at least one target device may be determined. Processor overhead associated with one or more data compression processes, and one or more operating conditions of the storage system may be determined. Based at least at least in part upon the determined link capacity, the determined processor overhead, and the determined one or more operating conditions, one or more settings of a data replication operation of the storage system may be adapted. The data replication operation may be performed according to the adapted one or more settings.

Another aspect may provide a system including a processor and memory. The memory stores computer program code that when executed on the processor may cause the processor to execute a data replication operation to replicate data between at least one source device and at least one target device in a storage system. The processor may perform the operations of determining a link capacity of a link between at least one source device and at least one target device, determining processor overhead associated with one or more data compression processes, and determining one or more operating conditions of the storage system. Based at least at least in part upon the determined link capacity, the determined processor overhead, and the determined one or more operating conditions, one or more settings of a data replication operation of the storage system may be adapted. The data replication operation may be performed according to the adapted one or more settings.

Another aspect may provide a computer program product including a non-transitory computer readable storage medium having computer program code encoded thereon that when executed on a processor of a computer may cause the computer to execute a data replication operation to replicate data between at least one source device and at least one target device in a storage system. The computer program product may include computer program code for determining a link capacity of a link between at least one source device and at least one target device, determining processor overhead associated with one or more data compression processes, and determining one or more operating conditions of the storage system. Based at least at least in part upon the determined link capacity, the determined processor overhead, and the determined one or more operating conditions, one or more settings of a data replication operation of the storage system may be adapted. The computer program product may include computer program code for performing the data replication operation according to the adapted one or more settings.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 3 is a flow diagram of an example of a process to perform data replication from a source to a target in accordance with an illustrative embodiment;

FIG. 4 is a flow diagram of an example of a process to determine system conditions for the data replication process of FIG. 3 in accordance with an illustrative embodiment;

FIG. 5 is a flow diagram of an example of a process to adapt settings of the data replication process of FIG. 3 in accordance with an illustrative embodiment; and FIG. 6 is a block diagram of an example of a hardware device that may perform at least a portion of the processes shown in FIGS. 3, 4 and 5.

DETAILED DESCRIPTION

Figure 1:
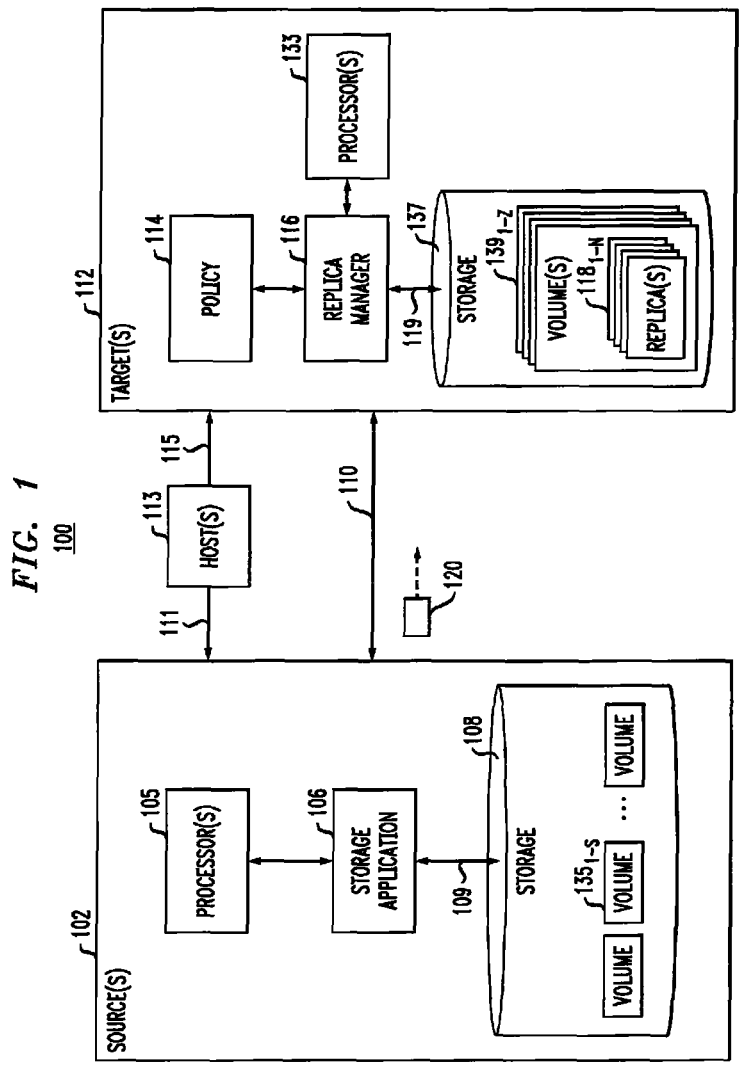
FIG. 1 is a block diagram of an example of a storage system to perform data replication from a source to a target in accordance with an illustrative embodiment.

FIG. 1 shows an example storage system 100. In accordance with illustrative embodiments, storage system 100 may adapt settings of synchronous data replication operations and/or time-based asynchronous data replication cycles based on operating conditions of storage system 100 and/or user settings of storage system 100.

Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Target site 112 may include replica manager 116 that manages a plurality of replicas $118_{1-N}$ (generally referred to herein as replicas 118) according to a policy 114 (e.g., a replication and/or retention policy). Replicas 118 may be stored in one or more volumes $139_{1-Z}$ of storage 137 of target site 112. Target site 112 may also include one or more processors 133. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform data replication 120 from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include internal (e.g., short distance) communication links (shown as communication links 109 and 119) to transfer data between storage volumes $139_{1-Z}$ of storage 137 for storing replicas $118_{1-N}$, such as an InfiniBand (IB) link or Fibre Channel (FC) link.

In illustrative embodiments, storage system 100 may employ a snapshot (or replication) mechanism to replicate data between source site 102 and target site 112. A replica (or snapshot) may be created from data within storage 108 and transferred to one or more target sites during a data replication cycle by data replication 120. Data replication 120 may be performed based on data replication policies that may define various settings for data recovery operations, shown as policy 114. For example, policy 114 may define a plurality of attributes, such as a frequency with which replicas 118 are generated and how long each replica 118 is kept at target site 112. In some embodiments, one or both of storage application 106 and/or replica manager 116 may define a remote replica lag (e.g., the length of time during which updates may be lost in case of a failure of source site 102), a recovery point objective (RPO) (e.g., a maximum acceptable lag time between the time data is committed to source site 102 and the time the data is committed to target site 112 or an acceptable amount of data loss measured in time), a recovery time objective (RTO) (e.g., the time taken to perform the recovery), the mode of replication (e.g., synchronous, asynchronous, continuous data protection (CDP), point in time (PIT), and so forth), and/or other attributes. For example, in one embodiment, storage application 106 may define the remote replica lag, RPO, RTO, and/or other attributes, and policy 114 and replica manager 116 may define the retention policy. In some embodiments, policy 114 may define the remote replica lag, RPO, RTO, retention policy, and/or other attributes.

Storage 108 may include one or more consistency groups, shown as consistency groups $147_{1-Q}$, each consistency group 147 including two or more volumes 135. For example, a consistency group (or snapgroup) may be a group of volumes 135 that are treated as a single entity for data replication and data migration. For example, a consistency group (or snapgroup) may be a group of volumes 135 for which replicas (e.g., snapshots) 118 are generated at the same time.

As described herein, in example embodiments, data replication 120 may be asynchronous data replication performed at time-based intervals during operation of storage system 100. The timing of asynchronous replication cycles and the retention of the replicas 118 may be managed by one or both of storage application 106 of source site 102 and/or replica manager 116 of target site 112. In one embodiment, storage application 106 of source site 102 may define the timing of asynchronous replication cycles, and the retention may be defined by policy 114. For example, asynchronous data replication may periodically generate snapshots (or replicas), scan and compare the snapshots to determine changes in data between the snapshots, and transfer the data difference to target 112. The frequency with which to perform replication cycles may be determined by a recovery point objective (RPO) and/or retention policy settings of policy 114. For example, policy 114 may define an RPO setting of x seconds, where x may be a positive integer, to ensure that the most recent available replica 118 stored on target 112 reflects the state of data stored on source site 102 no longer than x seconds ago. Policy 114 may also determine how many replicas 118 should be maintained, at what time (e.g., what time of day, week, month, etc.), and for what duration. Since asynchronous data replication operations may occur during operation of storage system 100, illustrative embodiments may desirably reduce system resources consumed by the asynchronous data replication operation.

In example embodiments, data replication 120 may alternatively be synchronous data replication performed when data is changed on source site 102. For example, synchronous data replication operations may be performed as data on a production volume of source site 102 is changed to update corresponding data stored on target sites 112. Since synchronous data replication operations may occur as data is changed on a production volume of source site 102, illustrative embodiments may desirably reduce latency between the data change and completion of the synchronous data replication operation.

Illustrative embodiments may achieve reduced latency for synchronous data replication operations and reduced system resource consumption for asynchronous data replication operations. For example, illustrative embodiments may compute a score for each data transfer of a data replication operation based on current conditions of storage system 100 and system (or user) requirements, for example, based on policy 114. For example, in an embodiment, the current system conditions may include one or more of processor utilization of processor(s) 105, a link utilization or latency of an internal link of the target (e.g., one or more links (e.g., links 119) between storage devices of target 112), and a link utilization or latency of an external link of the target (e.g., communication link 110). In an embodiment, the system (or user) requirements may also include a replication priority and a link bandwidth of the internal link of the target and a link bandwidth of the external link of the target.

Based on current system conditions and system (or user) requirements, described embodiments may dynamically determine which compression process to use for the data transfer. For example, an illustrative embodiment may employ a number of determined compression levels where each compression level may employ different settings for a compression process, or different compression processes. Some embodiments may determine compression employed by one or more of target devices, allowing storage system 100 to communicate with target devices storing data compressed by various different compression processes.

Illustrative embodiments may provide a process for adapting compression processing for data replication operations. As described, there can be competing requirements between different data replication operations, for example: (1) minimization of processor utilization, (2) minimization of communication link usage, (3) minimization of internal data transfers (e.g., within the source and/or target), (3) maximization of communication link throughput, and (4) minimization of latency for synchronous operations. Illustrative embodiments may dynamically adapt (or select) compression levels for each data replication operation based on such parameters. For example, in some embodiments, compression of a given data replication operation may be adaptively set from, for example, level-0 having no compression to level-10 having full compression. Described processes may be employed for both synchronous (or "sync") and asynchronous (or "async") data replication operations, and over either short distance or long distance.

Figure 2:
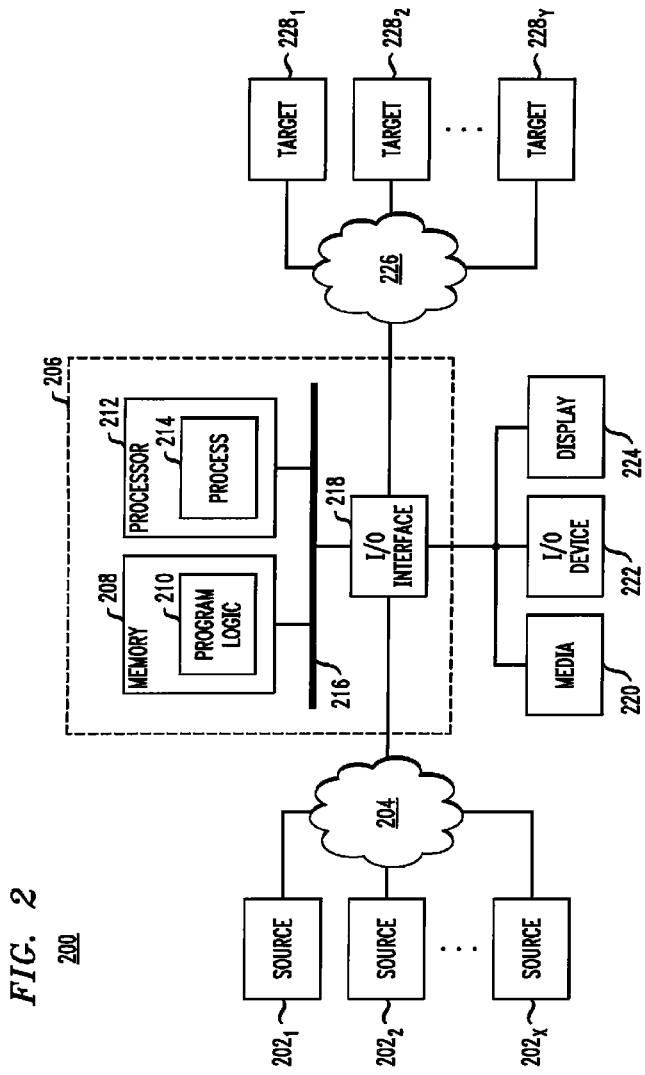
FIG. 2 is a block diagram of another example of a storage system to perform data replication from a source to a target in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices 202$_1$-202$_X$ via network 204. In some embodiments, communications I/O interface 218 may couple apparatus 206 to one or more target devices 228$_1$-228$_Y$ via network 226. In some embodiments, network 226 of FIG. 2 may be a communication fabric between volumes of targets 228. For example, in some embodiments, network 226 may be an InfiniBand (IB) network or a Fibre Channel (FC) network. Further, in an illustrative embodiment, apparatus 206 may be implemented as part of host 104 of FIG. 1.

Referring to FIG. 3, process 300 is an example of a process to perform at least a part of a data replication operation of storage system 100 in accordance with illustrative embodiments. Process 300 may be employed for one or both of synchronous data replication operations and asynchronous data replication operations. At block 302, a data replication operation of storage system 100 begins, for example when storage system 100 begins either a synchronous or asynchronous data replication operation. At block 304, a processor overhead level and a compression level for current settings for data replication may be determined. For example, at block 304 the processor utilization (e.g., a percentage of processor time) required to perform a current compression level may be determined, for example, based on one or more data replication settings used for a previous data replication operation.

At block 306, one or more current system conditions of storage system 100 may be determined. An illustrative embodiment of block 306 will be described in conjunction with FIG. 4. At block 308, one or more settings of the data replication operation may be dynamically adapted based on the one or more current system conditions determined at block 306. An illustrative embodiment of block 308 will be described in conjunction with FIG. 5. At block 310, the data replication operation may be performed in accordance with the one or more settings adapted at block 308. At block 312, data replication process 300 completes.

Referring to FIG. 4, process 306' is an example of a process to perform the system condition determination operation of block 306 of FIG. 3, in accordance with illustrative embodiments. At block 402, process 306' starts. At block 404, characteristics of a communication link (e.g., communication link 110 of FIG. 1 or network 204 of FIG. 2) of storage system 100 may be determined. In illustrative embodiments, a bandwidth of communication link 110 and an estimate of available capacity (e.g., in MB/sec, etc.) of communication link 110 may be determined. For example, the available capacity of communication link 110 may be estimated based on a current number of I/O operations on the communication link and an average size of each I/O operation. The bandwidth of communication link 110 may be estimated based on the type of communication link employed, or dynamically computed during operation of storage system 100.

At block 406, a current processor usage may be determined for one or more processors of the storage array (e.g., processors 105 of source site 102 and/or processors 133 of target site 112). The processor usage may be determined as, for example, a percentage value of total available processor capacity (e.g., between 0%, where the processor is idle, and 100%, where the processor is completely loaded). Processor usage may be used since compressing data associated with data replication operations can require potentially processor-intensive compression processing. Compressing data associated with data replication operations may be performed quickly when the processor use is low, but could cause a bottleneck or system slowdown when the processor use is high.

At block 408, characteristics of an internal communication link (e.g., a link of communication fabric between volumes of source site 102 and/or a link of communication fabric between volumes of target site 112, such as, for example, communication links 109 and/or 119 of FIG. 1) of the storage system may be determined. In illustrative embodiments, a bandwidth of communication links 109 and/or 119 may be determined, for example based on the type of communication link employed, or dynamically computed during operation of storage system 100. In some embodiments, communication links 109 and/or 119 may be an InfiniBand (IB) network or a Fibre Channel (FC) network. An estimate of available capacity (e.g., in MB/sec, etc.) of communication links 109 and/or 119 may also be determined, for example, based on a current number of I/O operations on the link and an average size of each I/O operation.

At block 410, a priority level associated with the data replication operation may be determined. As described herein, since asynchronous data replication operations occur as background processes during regular operation of storage system 100, it may be important to reduce system resources consumed by the asynchronous data replication operation. Alternatively, since synchronous data replication operations may be performed as data stored in storage 108 is changed, it may be important to reduce latency between the data change and completion of the synchronous data replication operation. In some embodiments, a synchronous data replication operation may have a higher priority level than an asynchronous data replication operation. Further, some embodiments may employ different priority levels within each type of data replication operation (e.g., to assign priority levels between multiple synchronous data replication operations, and to assign priority levels between multiple asynchronous data replication operations). For example, a first data replication operation from a first given source volume may be considered more important than a second data replication operation from second given source volume and, therefore, the first data replication operation may be assigned a higher priority level. A high priority data replication operation may have its associated data compressed, potentially at the expense of other, lower priority data replication operations of storage system 100.

At block 412, the type of data replication operation may be determined (e.g., asynchronous or synchronous). As described herein, a synchronous data replication operation may have its latency increased by performing compression. However, it may be possible that a faster transfer of compressed (versus uncompressed) data could make up for the additional latency by performing the data replication by transferring less data. Described embodiments may determine the processor time spent to perform data compression.

In some embodiments, as indicated by dashed line 414, blocks 418, 420 and 422 may be optionally performed. At block 418, one or more weight coefficients may be received from a user of storage system 100. For example, the user may desirably select an importance level (e.g., weight coefficient) for one or more of the system conditions. For example, in some instances, a user may prioritize minimizing latency over efficient data transfer, and therefore, select corresponding weight coefficients to prioritize processor utilization over link capacity, for example. At block 420, each of the determined system conditions may be weighted by the corresponding weight coefficient to determine an overall weighted system condition parameter at block 422. The overall weighted system condition parameter may be employed to adapt one or more settings of the data replication operations, as will be described in greater detail in conjunction with FIG. 5. At block 424, process 306' for determination of system conditions completes.

In other embodiments, as indicated by dashed line 416, blocks 418 and 420 may not be performed. Instead, as indicated by dashed line 416, at block 422, an overall system condition parameter may be determined at block 422. The overall system condition parameter may be unweighted (e.g., all system conditions have the same importance), and the system condition parameter may be employed to adapt one or more settings of the data replication operations, as will be described in greater detail in conjunction with FIG. 5. At block 424, process 306' for determination of system conditions completes.

As will be described in conjunction with FIG. 5, in some embodiments, when the processor usage is above a threshold level, compression may only be performed for certain operating conditions. For example, in some embodiments, when the processor usage is above a threshold level, compression may only be performed for data replication operations having certain priority level(s) (e.g., high priority data replication operations), while data replications having other priority level(s) (e.g., low priority data replication operations) may not be compressed.

In other embodiments, when the processor usage is above (e.g., has reached) a threshold level, compression may only be performed based on operating conditions of the communication link determined at block 404, and/or based on operating conditions of the internal communication link, as determined at block 408. For example, in some embodiments, data transfers over the internal communication link (e.g., communication links 109 and/or 119 of FIG. 1) can become a bottleneck for other system operations. For example, non-compressed data replication operations could cause high usage of communication links 109 and/or 119 to transfer replicated data to target volumes. Employing various compression processes may reduce the replicated data to transfer by 50% or more and reduce the usage of the communication link.

Additionally, described embodiments may employ different compression processes (or different levels of compression of a given compression process) to provide trade-offs between processor utilization and data compression level depending on various system operating conditions. For example, if the processor utilization is high (e.g., as determined at block 406) and either the available link bandwidth of a link between the source device and target device (e.g., as determined at block 404) or the available link bandwidth of a link internal to the target device (e.g., determined at block 408) is low, then it may be desirable to perform low compression (e.g., to reduce the data by 10%) that would not require much additional processor utilization. Settings may be dynamically adapted to a tradeoff compression level to reduce the amount of data transferred on the links without requiring a high amount of additional processor utilization.

Other embodiments may employ an overall system condition parameter (e.g., as determined at block 422 of FIG. 4) to adapt the compression settings for data replication operations.

Some embodiments may also consider processor utilization of the target devices (e.g., processors 133 of FIG. 1); although in typical systems, processor utilization of the target devices does not need to be considered. Typically, processor utilization of target devices may be lower since the target controls data transfers to the volumes and, in some embodiments, may decompress the data for storage.

Referring to FIG. 5, process 308' is an example of a process to perform the setting adaptation operation of block 308 of FIG. 3, in accordance with illustrative embodiments. At block 502, process 308' starts. At block 504, a compression level, L, may be determined for data associated with the data replication operation. As described herein, the compression level, L, may be determined based on one or more system conditions determined at block 306. As described, some embodiments may employ an overall system condition parameter (e.g., as determined at block 422 of FIG. 4) to determine the compression level, L. Compression level, L, may correspond to a percentage of compression desired to be achieved for data associated with a given data replication operation.

At block 506, a compression percentage, P, may be determined for data replication operations. As described herein, the compression percentage, P, may be determined based on one or more system conditions determined at block 306. As described, some embodiments may employ an overall system condition parameter (e.g., as determined at block 422 of FIG. 4) to determine the compression percentage, P. Compression percentage, P, may correspond to a percentage of data replication operations that should be compressed to compression level L based on current system operating conditions.

At block 508, a compression process to achieve compression level L may be selected. For example, based on determined system operating conditions, a compression process may be selected to compress the data associated with the data replication operation to compression level L while also meeting other system operating conditions, such as a minimum increase to processor utilization.

At block 510, compression level L may be applied to the compression percentage P of data blocks of the data replication operation. In other words, P % of data blocks of data associated with the data replication may be compressed to level L. In an embodiment, the data blocks may be pages associated with the storage volumes of target sites 112. At block 512, process 308' completes.

In some embodiments, current system conditions (e.g., at block 306 of FIG. 3) may be computed in the background periodically during operation of storage system 100, for example, once every 10 seconds. The compression settings may be determined based on the determined current system conditions (e.g., at block 308 of FIG. 3). As described herein, compression level L may range from zero compression, for example by transferring data blocks associated with the data replication operation without any additional compression. In some embodiments, some data blocks may be stored in storage 108 in a compressed state, but no additional compression will be applied to transfer the data block as part of the data replication operation.

As described, P % of the pages may be compressed with compression level L. In embodiments where some data blocks may be stored in storage 108 in a compressed state, additional compression L may be applied. P and L may be determined based on operating conditions of storage system 100, for example as determined at block 306 of FIG. 3.

Multiple processes for determining L and P may be employed. In an illustrative embodiment, for synchronous data replication operations, compressed data blocks (e.g., pages) may be sent only if the corresponding data blocks are already compressed as stored in storage 108. Otherwise, for synchronous data replication operations, the data blocks are not compressed, which reduces the latency of performing the synchronous data replication operation.

In described embodiments, for asynchronous data replication operations, data compression may be dynamically adapted based on one or more operating conditions of storage system 100. In an illustrative embodiment, data associated with an asynchronous data replication operation may be compressed if processor utilization is less than (e.g., has not reached) a predetermined threshold level (e.g., as determined at block 406 of FIG. 4), and the available link capacity is less than (e.g., has not reached) a predetermined threshold level (e.g., as determined at block 404 of FIG. 4). For example, if the processor utilization is less than 75% of the total processor capacity, and the available link capacity is less than 25% of the total link capacity, then compression may be employed at a default compression level. In some embodiments, if the processor utilization is greater than 75% of the total processor capacity (e.g., has reached a predetermined threshold), and the available link capacity is greater than 25% of the total link capacity (e.g., has reached a predetermined threshold), then compression may not be employed, or may be employed at a reduced compression level.

In some embodiments, the link capacity of links of source site 102 and/or target site 112 (e.g., communication links 109 and/or 119 of FIG. 1) may also be considered when determining whether to perform data compression (or to what level to perform compression). For example, data associated with an asynchronous data replication operation may be compressed if processor utilization is less than (e.g., has not reached) a predetermined threshold level (e.g., as determined at block 406 of FIG. 4), the available link capacity is less than (e.g., has not reached) a predetermined threshold level (e.g., as determined at block 404 of FIG. 4), and the available target link capacity is also less than (e.g., has not reached) a predetermined threshold level (e.g., as determined at block 408 of FIG. 4). For example, if the processor utilization is less than 75% of the total processor capacity, the available link capacity is less than 25% of the total link capacity, and the available target link capacity is less than 25% of the total link capacity, then compression may be employed at a default compression level. In some embodiments, if the processor utilization is greater than 75% of the total processor capacity (e.g., has reached a predetermined threshold), the available link capacity is greater than 25% of the total link capacity (e.g., has reached a predetermined threshold), and the available target link capacity is less than 25% of the total link capacity (e.g., has reached a predetermined threshold), then compression may not be employed, or may be employed at a reduced compression level.

Some embodiments may further consider a priority level of the data replication operation to decide whether to employ data compression (or to what level to perform compression).

In an illustrative embodiment, the compression level (e.g., L) for a given data replication operation may be set based on the processor utilization. For example, the compression level may be determined by: $L=[1-(\text{processor load})]*10$. In other words, the compression level L may be negatively correlated with the utilization (or load) of the processor, multiplied by 10 such that L is an integer value rather than a decimal or fractional value. For example, as the processor load increases from 0% (idle) to 100% (fully utilized), the compression level L decreases from a setting of 10 (maximal compression) to a setting of 0 (no compression).

In another illustrative embodiment, the compression level L for a given data replication operation may be set based on the processor utilization and the link capacity (e.g., of communication link 110 between source site 102 and target site 112). For example, the compression level may be determined by: $L=[1-(\text{processor load})]*(\text{link load})*10$. In other words, if either the processor load decreases or the load on the link increases, the compression process becomes more aggressive by employing greater compression (e.g., L increases). For example, with a processor load of 20% and a link load of 80%, the compression level may be determined by: $L\approx 6=(1-0.2)*0.8*10$. If the processor load decreases to 10% and link load increases to 90%, the compression level increases to $L\approx 8=(1-0.1)*0.9*10$. As the processor utilization decreases and the link usage increases, the compression level increases.

In yet another illustrative embodiment, the compression level L for a given data replication operation may be set based on the processor utilization, the link capacity (e.g., of communication link 110 between source site 102 and target site 112), the link capacity of an internal communication link of target 112 (e.g., network 226), and a priority level of the data replication operation. For example, the compression level may be determined by: $L=[1-(\text{processor load})]*(\text{link load})*[1-(\text{internal link load})]*(\text{priority level})$.

In the illustrative embodiments described herein, the processor load, link load, internal link load and priority levels may be measured in percentages, or on a 0 to 1 scale.

Described embodiments provide processes for performing data replication operations in a storage system. Various system conditions may be determined, such as a link capacity of a link between at least one source device and at least one target device, processor overhead associated with a data compression process, and operating conditions of the storage system. The operating conditions of the storage system may include a processor usage of processor(s) of the storage system, an available bandwidth for data transfers within the storage system, an available link bandwidth for data transfers on the link between the at least one source device and the at least one target device, a priority level of an associated data replication operation, and a replication mode of the associated data replication operation. Based at least at least in part on the determined system conditions, one or more settings of a data replication operation of the storage system may be adapted and the data replication operation may be performed according to the adapted settings.

Referring to FIG. 6, in some embodiments, source 102 and/or target 112 may be implemented as one or more computers. As shown, computer 600 includes processor 602, volatile memory 604 (e.g., RAM), non-volatile memory 606 (e.g., a hard disk drive, solid state drive such as a flash drive, a hybrid magnetic and solid state drive, etc.), graphical user interface (GUI) 608 (e.g., a mouse, a keyboard, a display, etc.) and input/output (I/O) device 620. Non-volatile memory 606 stores computer instructions 612, an operating system 616 and data 618 such that, for example, the computer instructions 612 are executed by the processor 602 out of volatile memory 604 to perform at least a portion of processes 300, 306' and 308' (e.g., FIGS. 3, 4 and 5). Program code may be applied to data entered using an input device of GUI 608 or received from I/O device 620.

Processes 300, 306' and 308' (e.g., FIGS. 3, 4 and 5) are not limited to use with the hardware and software of FIG. 6 and may find applicability in any computing or processing environment and with any type of machine or set of machines that is capable of running a computer program. Processes 300, 306' and 308' (e.g., FIGS. 3, 4 and 5) may be implemented in hardware, software, or a combination of the two.

The processes described herein are not limited to the specific embodiments described. For example, processes 300, 306' and 308' are not limited to the specific processing order shown in FIGS. 3, 4 and 5. Rather, any of the blocks of processes 300, 306' and 308' may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

I claim:
1. A method comprising:
   determining a link capacity of a link between at least one source device and at least one target device of a storage system;
   determining processor overhead associated with one or more data compression processes;
   identifying a replication mode associated with a data replication operation of the storage system, the identifying including detecting whether the data replication operation is a synchronous data replication operation or an asynchronous data replication operation;
   weighting, by respective weight coefficients, each of the determined link capacity and the determined processor overhead;
   adapting, based upon the weighting of the determined link capacity, the determined processor overhead, and the identified replication mode, one or more data compression settings of the data replication operation, the adapting including (i) selecting a first value for a compression level, L, of the data replication operation when the data replication operation is an asynchronous data replication operation, and (ii) selecting a second value for the compression level, L, when the data replication operation is an asynchronous data replication operation; and performing the data replication operation according to the adapted one or more data compression settings, wherein the data replication operation replicates data from the at least one source device to the at least one target device.

2. The method of claim 1, wherein, for synchronous data replication, the method further comprises performing the data replication operation without compression to reduce system lag.

3. The method of claim 1, wherein, for synchronous data replication, the method further comprises performing the data replication operation with compression if one or more pages of the data replication operation are compressed on the at least one target device.

4. The method of claim 1, wherein for asynchronous data replication, the method further comprises performing the data replication operation with compression if at least one of a processor usage and an available link bandwidth have reached respective thresholds.

5. The method of claim 4, further comprising:
performing the data replication operation with compression if the processor usage is less than 75 percent and the available link bandwidth is less than 25 percent,
otherwise, performing the data replication operation without compression.

6. The method of claim 1, further comprising determining, based upon the determined link capacity, the determined processor overhead, and identified replication mode of the data replication operation, a system condition parameter of the storage system.

7. The method of claim 1, wherein the weight coefficients are set by a user of the storage system.

8. The method of claim 1, further comprising determining a corresponding compression process to reach the compression level, L, for the data replication operation.

9. The method of claim 1, wherein:
adapting the or more data compression settings of the data replication operation further includes determining a compression percentage, P, based on the replication mode of the data replication operation,
the compression percentage, P, determines a percentage of data blocks of each data replication operation to compress.

10. The method of claim 9, wherein each data block corresponds to a memory page of a solid state memory of the storage system.

11. The method of claim 9, further comprising:
compressing P percent of data blocks of each data replication operation with a compression level, L;
forming the compressed P percent of data blocks with associated 100−P percent of uncompressed data blocks into one or more data transfers between the at least one source device and the at least one target device; and
performing the one or more data transfers.

12. A system comprising:
a processor; and
memory storing computer program code that when executed on the processor causes the processor to execute a data replication process operable to perform the operations of:
determining a link capacity of a link between at least one source device and at least one target device of a storage system;

determining processor overhead associated with one or more data compression processes;
identifying a replication mode associated with a data replication operation of the storage system, the identifying including detecting whether the data replication operation is a synchronous data replication operation or an asynchronous data replication operation;
weighting, by respective weight coefficients, each of the determined link capacity and the determined processor overhead;
adapting, based upon the weighting of the determined link capacity, the determined processor overhead and the identified replication mode, one or more data compression settings of the data replication operation, the adapting including (i) selecting a first value for a compression level, L, of the data replication operation when the data replication operation is an asynchronous data replication operation, and (ii) selecting a second value for the compression level, L, when the data replication operation is an asynchronous data replication operation; and
performing the data replication operation according to the adapted one or more data compression settings,
wherein the data replication operation to replicate data from the at least one source device to the at least one target device.

13. A computer program product including a non-transitory computer readable storage medium having computer program code encoded thereon that when executed on a processor of a computer causes the computer to execute a data replication process, the computer program product comprising:
computer program code for determining a link capacity of a link between at least one source device and at least one target device of a storage system;
computer program code for determining processor overhead associated with one or more data compression processes;
computer program code for identifying a replication mode associated with a data replication operation of the storage system, the identifying including detecting whether the data replication operation is a synchronous data replication operation or an asynchronous data replication operation;
computer program code for weighting, by respective weight coefficients, each of the determined link capacity and the determined processor overhead;
computer program code for adapting, based upon the weighting of the determined link capacity, the determined processor overhead, and the identified replication mode of the data replication operation, one or more data compression settings of the data replication operation, the adapting including (i) selecting a first value for a compression level, L, of the data replication operation when the data replication operation is an asynchronous data replication operation, and (ii) selecting a second value for the compression level, L, when the data replication operation is an asynchronous data replication operation; and
computer program code for performing the data replication operation according to the adapted one or more data compression settings.

* * * * *